United States Patent
Tanna et al.

(10) Patent No.: US 9,704,118 B2
(45) Date of Patent: Jul. 11, 2017

(54) PREDICTIVE ANALYTICS IN DETERMINING KEY PERFORMANCE INDICATORS

(71) Applicants: Jemin Tanna, Bangalore (IN); Jiten Kumar Mohnani, Bangalore (IN)

(72) Inventors: Jemin Tanna, Bangalore (IN); Jiten Kumar Mohnani, Bangalore (IN)

(73) Assignee: SAP SE, Walldorf (DE)

( * ) Notice: Subject to any disclaimer, the term of this patent is extended or adjusted under 35 U.S.C. 154(b) by 775 days.

(21) Appl. No.: 13/793,643

(22) Filed: Mar. 11, 2013

(65) Prior Publication Data

US 2014/0257545 A1    Sep. 11, 2014

(51) Int. Cl.
*G05B 19/401*    (2006.01)
*G06Q 10/06*    (2012.01)
*G05B 23/02*    (2006.01)

(52) U.S. Cl.
CPC ... *G06Q 10/06393* (2013.01); *G05B 23/0229* (2013.01)

(58) Field of Classification Search
CPC ............ G06Q 10/06393; G05B 23/0229
See application file for complete search history.

(56) References Cited

U.S. PATENT DOCUMENTS

| | | | |
|---|---|---|---|
| 6,256,550 B1 | 7/2001 | Wu et al. | |
| 6,609,040 B1 * | 8/2003 | Brunnemann | G06Q 10/06 700/108 |
| 6,895,471 B1 * | 5/2005 | Tse | G06F 17/30008 707/999.008 |
| 8,061,604 B1 | 11/2011 | Wobbe et al. | |
| 8,170,893 B1 | 5/2012 | Rossi et al. | |
| 8,374,897 B2 | 2/2013 | Macgregor et al. | |
| 8,417,549 B2 | 4/2013 | Rakesh et al. | |
| 8,600,955 B2 | 12/2013 | Werner | |
| 8,917,854 B2 * | 12/2014 | Castellani | H04M 3/5175 379/265.03 |
| 9,104,970 B2 * | 8/2015 | Lahav | G06Q 30/02 |
| 2003/0149608 A1 * | 8/2003 | Kall et al. | G06Q 10/06 705/7.27 |

(Continued)

FOREIGN PATENT DOCUMENTS

EP    1591170 A2    11/2005

OTHER PUBLICATIONS

Extended European Search Report for EP Application No. 13004580.0, mailed on Feb. 27, 2014, 7 pages.

(Continued)

*Primary Examiner* — M. N. Von Buhr
(74) *Attorney, Agent, or Firm* — Brake Hughes Bellermann LLP

(57) ABSTRACT

Disclosed are a system, computer readable medium and method for predicting key performance indicators. The method includes receiving one or more data pairs, the one or more data pairs indicating a performance parameter and reason indicator associated with the performance parameter, deriving a formulaic relationship, utilizing a regression formula, between the reason indicator and the performance parameter, predicting at least one key performance indicator (KPI), utilizing a regression formula, for each of the one or more data pairs, associating a cost with each of the one or more data pairs, and varying a parameter based on the KPI and the associated cost.

16 Claims, 4 Drawing Sheets

(56) References Cited

U.S. PATENT DOCUMENTS

| | | |
|---|---|---|
| 2004/0117050 A1 | 6/2004 | Oskin et al. |
| 2005/0278247 A1 | 12/2005 | Benedict et al. |
| 2005/0278492 A1 | 12/2005 | Stakutis et al. |
| 2006/0031840 A1* | 2/2006 | Yigit et al. ............ G06F 9/5088 718/102 |
| 2006/0242033 A1* | 10/2006 | Corbett ................ G06Q 10/087 705/28 |
| 2006/0250248 A1* | 11/2006 | Tu .......................... G06Q 10/06 340/572.4 |
| 2007/0050070 A1 | 3/2007 | Strain et al. |
| 2007/0174290 A1 | 7/2007 | Narang et al. |
| 2009/0138334 A1 | 5/2009 | Henby et al. |
| 2009/0157569 A1 | 6/2009 | Henby et al. |
| 2009/0281845 A1* | 11/2009 | Fukuda ................. G06Q 10/10 705/7.39 |
| 2010/0274637 A1* | 10/2010 | Li .......................... G06Q 10/06 379/265.06 |
| 2010/0332404 A1 | 12/2010 | Valin |
| 2012/0011096 A1* | 1/2012 | Aggarwal ......... G06F 17/30377 707/602 |
| 2012/0150576 A1 | 6/2012 | Wagenblatt et al. |
| 2012/0179283 A1* | 7/2012 | Krause ................ G05B 13/042 700/104 |
| 2012/0245896 A1* | 9/2012 | Bernardini et al. .. G06F 11/366 702/183 |
| 2013/0006969 A1* | 1/2013 | He .................... G06F 17/30592 707/722 |
| 2013/0132127 A1* | 5/2013 | Mathai .................... G01W 1/00 705/4 |
| 2013/0138672 A1 | 5/2013 | Wasserman |
| 2013/0173663 A1 | 7/2013 | Piccazzo et al. |
| 2013/0311454 A1 | 11/2013 | Ezzat |
| 2014/0012592 A1* | 1/2014 | Ivanovic ................ G06Q 50/22 705/2 |
| 2014/0019206 A1 | 1/2014 | Kraus et al. |
| 2014/0052847 A1* | 2/2014 | Jadallah ............. H04L 43/0876 709/224 |
| 2014/0068445 A1 | 3/2014 | Kempf et al. |
| 2014/0142737 A1 | 5/2014 | Tanna et al. |
| 2014/0156586 A1* | 6/2014 | Black ................ G06F 17/30592 707/600 |

OTHER PUBLICATIONS

Non-Final Office Action for U.S. Appl. No. 13/680,602, mailed on Mar. 18, 2015, 27 pages.
European Communication pursuant to Article 94(3) EPC for EP Application No. 13004580.0, mailed Feb. 24, 2015, 5 pages.
Non-Final Response for U.S. Appl. No. 13/680,602, filed Jun. 18, 2015, 10 pages.
Notice of Allowance for U.S. Appl. No. 13/680,602, on Jul. 22, 2015, 18 pages.

* cited by examiner

PREDICTIVE ANALYTICS IN DETERMINING KEY PERFORMANCE INDICATORS

FIELD

Embodiments relate to utilizing regression formulas to predict key performance indicators.

BACKGROUND

Large quantities of data are typically collected in many types of manufacturing environments. For example, data is collected for systems regarding product quality, system performance, system availability and costs. However, due to the nature of this data (e.g., quantity) systems have not been able to efficiently leverage this data in order to optimally set manufacturing equipment parameters in manufacturing environments or to predict the effects on the manufacturing environment upon setting manufacturing equipment parameters.

SUMMARY

One embodiment includes a method for predicting key performance indicators. The method includes receiving one or more data pairs, the one or more data pairs indicating a performance parameter and reason indicator associated with the performance parameter, deriving a formulaic relationship, utilizing a regression formula, between the reason indicator and the performance parameter, predicting at least one key performance indicator (KPI), utilizing a regression formula, for each of the one or more data pairs, associating a cost with each of the one or more data pairs, and varying a parameter based on the KPI and the associated cost.

Another embodiment includes a high-performance analytic appliance (HANA). The HANA includes at least one processor, and at least one memory storing code segments. When the code segments are executed by the processor, the processor receives one or more data pairs, the one or more data pairs indicating a performance parameter and reason indicator associated with the performance parameter, derives a formulaic relationship, utilizing a regression formula, between the reason indicator and the performance parameter, predicts at least one key performance indicator (KPI), utilizing a regression formula, for each of the one or more data pairs, associates a cost with each of the one or more data pairs, and varies a parameter based on the KPI and the associated cost.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
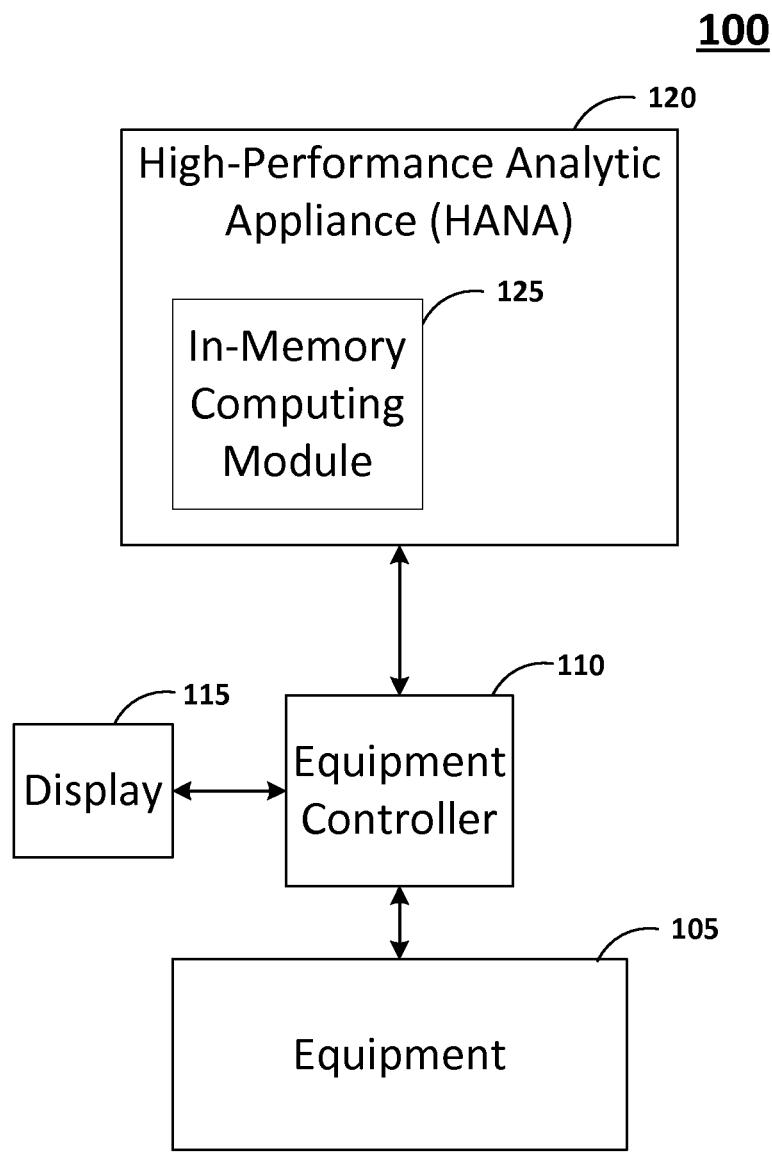
FIG. 1 illustrates a system using performance indicators and predictive analysis according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Brief Discussion of Equations

A common form of a linear equation in the two variables x and y is y=mx+b where m and b designate constants. The origin of the name "linear" comes from the fact that the set of solutions of such an equation forms a straight line in the plane. In this particular equation, the constant m determines the slope or gradient of that line and the constant term b determines the point at which the line crosses the y-axis, otherwise known as the y-intercept.

Regression is a statistical technique used to explain or predict the behavior of a dependent variable. A regression model may predict a value Y based on a function of X and β such that Y≈(X,β) Generally, a regression equation takes the form of Y=a+bx+e, where Y is the dependent variable that the equation tries to predict, X is the independent variable that is being used to predict Y, a is the Y-intercept of the line, and e is a value called the regression residual. In a general multiple regression model, there are p independent variables:

$$y = \beta_1 x_{i1} + \beta_2 x_{i2} + \ldots + \beta_p x_{ip} + \epsilon_i \qquad (1)$$

where,
i=1, n,
$x_{ij}$ is the $i^{th}$ observation on the $j^{th}$ independent variable, and
the first independent variable takes the value 1 for all i.
Equation 1 may be rewritten as:

$$y_i = x_i^T \beta + \epsilon_i \qquad (2)$$

where,
i=1, ..., n, and
T is time in that the observations (x) may be time bound.
In linear algebraic form, equation 2 may be rewritten utilizing the following equations:

$$y = \begin{pmatrix} y_1 \\ y_2 \\ \vdots \\ y_n \end{pmatrix} \qquad (3)$$

-continued $$X = \begin{pmatrix} x_1^T \\ x_2^T \\ \vdots \\ x_n^T \end{pmatrix} = \begin{pmatrix} x_{11} & \cdots & x_{1p} \\ x_{21} & \cdots & x_{2p} \\ \vdots & \ddots & \vdots \\ x_{n1} & \cdots & x_{np} \end{pmatrix} \quad (4)$$

$$\beta = \begin{pmatrix} \beta_1 \\ \beta_2 \\ \vdots \\ \beta_p \end{pmatrix} \quad (5)$$

$$\varepsilon = \begin{pmatrix} \varepsilon_1 \\ \varepsilon_2 \\ \vdots \\ \varepsilon_n \end{pmatrix} \quad (6)$$

Thus, equation 2 may be rewritten as:

$$\begin{pmatrix} y_1 \\ y_2 \\ \vdots \\ y_n \end{pmatrix} = \begin{pmatrix} x_{11} & \cdots & x_{1p} \\ x_{21} & \cdots & x_{2p} \\ \vdots & \ddots & \vdots \\ x_{n1} & \cdots & x_{np} \end{pmatrix} \begin{pmatrix} \beta_1 \\ \beta_2 \\ \vdots \\ \beta_p \end{pmatrix} + \begin{pmatrix} \varepsilon_1 \\ \varepsilon_2 \\ \vdots \\ \varepsilon_n \end{pmatrix} \quad (7)$$

Example embodiments may acquire and/or determine the independent variables (e.g., x and β) in the above equations and solve at least one of equations 1-7 for y or $y_i$ where y or $y_i$ is a key performance indicator (KPI).

Discussion of Example Embodiments

FIG. 1 illustrates a system using performance indicators and predictive analysis according to at least one example embodiment. As shown in FIG. 1, the system 100 includes equipment 105, an equipment controller 110 a display 115, and a high-performance analytic appliance (HANA) 120. The HANA 120 may have an associated in-memory computing module 125.

For example, the equipment 105 may be manufacturing equipment (e.g., a lathe, a robot, a computer numerical control (CNC) machine, baking equipment and the like). The equipment controller 110 may provide all necessary control instructions for operating the equipment 105. For example the equipment controller may include memory, a processor, a bus, switches, interfaces and other circuits and devices (not shown) to control the operation of the equipment 105. Display 115 may be, for example, a LCD display configured to provide a user interface with an operator of the equipment 105.

The HANA 120 (e.g., SAP™ HANA) may be a data warehouse appliance for processing high volumes of operational and transactional data in real-time. HANA may use in-memory analytics, an approach that queries data stored in random access memory (RAM) instead of on hard disk or flash storage.

The HANA 120 may use a replication server (e.g., SAP Sybase replication server) to copy and synchronize data from a data warehouse (e.g., HANA 120 being in the form of an in-memory database) in real-time. By running in parallel to the source application and/or data warehouse, the HANA 120 may be configured to allow users to query large volumes of data in real-time without having to wait for scheduled reports to run. The HANA 120 may be configured to support known standards such as structured query language (SQL). The HANA 120 may include a programming component (not shown) configured to allow creation (and editing) of and run customized applications on top of the HANA 120.

HANA 120 may be configured to store information about the operation of the equipment 105. For example, HANA 120 may store real-time and historical information about the equipment 105. The real-time and historical information may include, but is not limited to, operating speed, pieces per hour, quality statistics, temperatures, up-times, down-times and maintenance information (e.g., time to next service, component runtimes and the like).

The in-memory computing module 125 may be configured to receive data from and provide data to the equipment controller 110. The equipment controller 110 may use the provided data to, for example, set parameters (e.g., a target speed) of the equipment 105.

Figure 2:
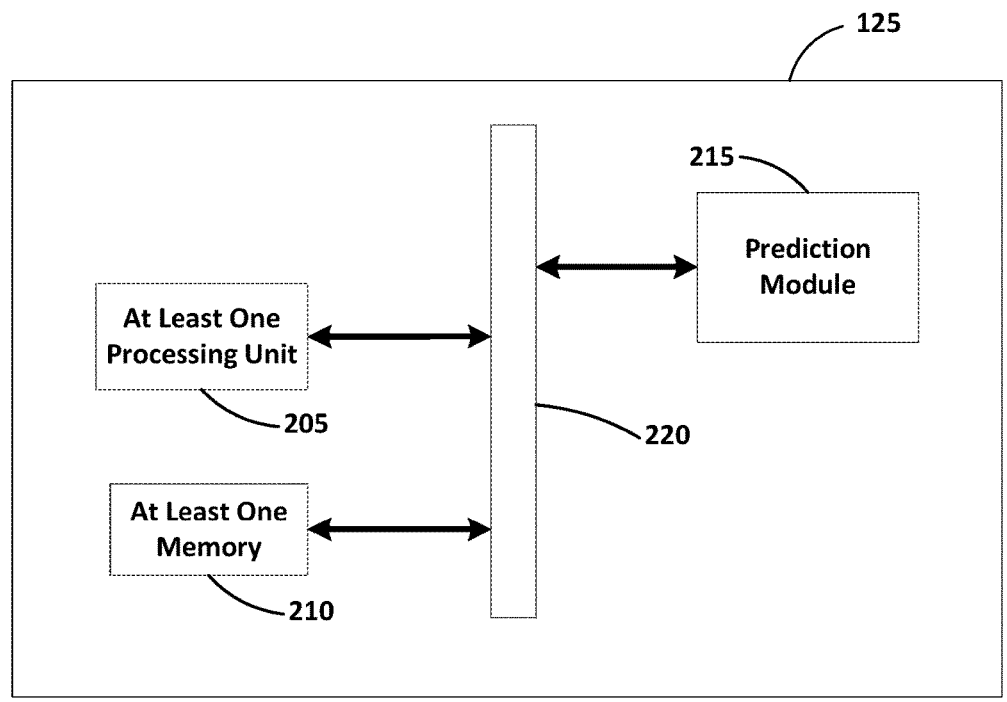
FIG. 2 illustrates an in-memory computing module according to at least one example embodiment.

FIG. 2 illustrates the in-memory computing module 125 according to at least one example embodiment. As shown in FIG. 2, the in-memory computing module 125 includes at least one processing unit 205, at least one memory 210 and a prediction module 215. The at least one processing unit 205, the at least one memory 210 and the prediction module 215 are communicatively coupled via bus 220. The in-memory computing module 125 may be, for example, a software implementation or an integrated circuit (e.g., application-specific integrated circuit).

In the example of FIG. 2, the in-memory computing module 125 may be at least one computing device and should be understood to represent virtually any computing device configured to perform the methods described herein. As such, the in-memory computing module 125 may be understood to include various standard components which may be utilized to implement the techniques described herein, or different or future versions thereof. By way of example, the in-memory computing module 125 is illustrated as including the at least one processing unit 205, as well as at least one memory 210 (e.g., a computer readable storage medium).

Thus, as may be appreciated, the at least one processing unit 205 may be utilized to execute instructions stored on the at least one memory 210, so as to thereby implement the various features and functions described herein, or additional or alternative features and functions. Of course, the at least one processing unit 205 and the at least one memory 210 may be utilized for various other purposes. In particular, it may be appreciated that the at least one memory 210 may be understood to represent an example of various types of memory and related hardware and software which might be used to implement any one of the modules described herein.

The at least one memory 210 may store an algorithm library. In HANA, the algorithm library may be known as a predictive algorithm library (PAL). The PAL may store algorithms associated with clustering, classification, association, and the like. For example, the PAL may store classifications algorithms including linear regression algorithms. Therefore, the PAL may store algorithms based on equations 1-7 described above.

As described above, HANA 120 may be configured to store information. The information may be stored in the at least one memory 210. The information may include data associated with a machine (e.g., machine 105), non-machine systems (e.g., inventory) and/or multi-element systems. For example, the information may include data associated with availability. Data associated with availability may include unscheduled downtime, extended break time, power loss, missing parts (maintenance or inventory), inconsistent timing, and the like. For example, the information may include data associated with performance. Data associated with performance may include calibration, quality, overloading, speed (increases or decreases), operator error, and the like.

For example, the information may include data associated with quality. Data associated with quality may include availability of parts, kanban delay, missing operators, rejected quantities, start-up instructions not followed, and the like. For example, the information may include data associated with efficiency or effectiveness. Data associated with efficiency or effectiveness may include tooling loss, tooling maintenance, waiting on system start-up events, system operation variability (e.g., temperature variation or spikes), and the like. Availability, performance, quality and/or efficiency (or effectiveness) may be called key performance indicators (KPI). KPI may include other measurable or determinable equipment and/or system information.

Machine (or system) efficiency (or effectiveness) may be determined based on other KPI. For example, efficiency (or effectiveness) may be determined based on losses (or reductions) in KPI. The losses may be, for example, availability losses, performance losses and/or quality losses. Availability losses may include set-up losses (e.g., poor planning or scheduling, insufficient operator skills, poor start-up controls, missing parts, poor tooling, and/or the like) and/or breakdown losses (e.g., lack of maintenance, operator inattentiveness, poor design, poor training, material failures, and/or the like).

Performance losses may include minor stoppages (as opposed to breakdowns) (e.g., material not available, operator error/absence, jams/misfeeds/overloads, changeover, and/or the like) and/or speed losses (e.g., incorrect settings, deliberate reduction, poor training, unclear design specifications, and/or the like). Quality losses may include start-up losses (e.g., poor machine change over, inconsistent materials, start-up checklist incorrect/unavailable, waiting on machine parameter stabilization, machine adjustment, and/or the like) and/or in-process losses (e.g., parameter (temperature, pressure) changes, inconsistent materials, process not followed, calibration, operator error, quantity rejections, and/or the like). Each of the aforementioned examples of losses may be given an associated reason indicator and may include an associated value related to, for example, difficulty to control or system impact. For example, the more difficult to control the loss and/or the more impactful the loss, the higher the value may be.

The prediction module 215 may be configured to predict a future KPI based on varying machine or system parameters and/or varying associated data (e.g., availability data, performance data quality data and/or efficiency (or effectiveness) data). The varying data may be dependent or independent data. For example, varying parts availability may result in a varying availability. Other dependent/independent relationships may be readily apparent in the above discussion of stored information.

Figure 3:
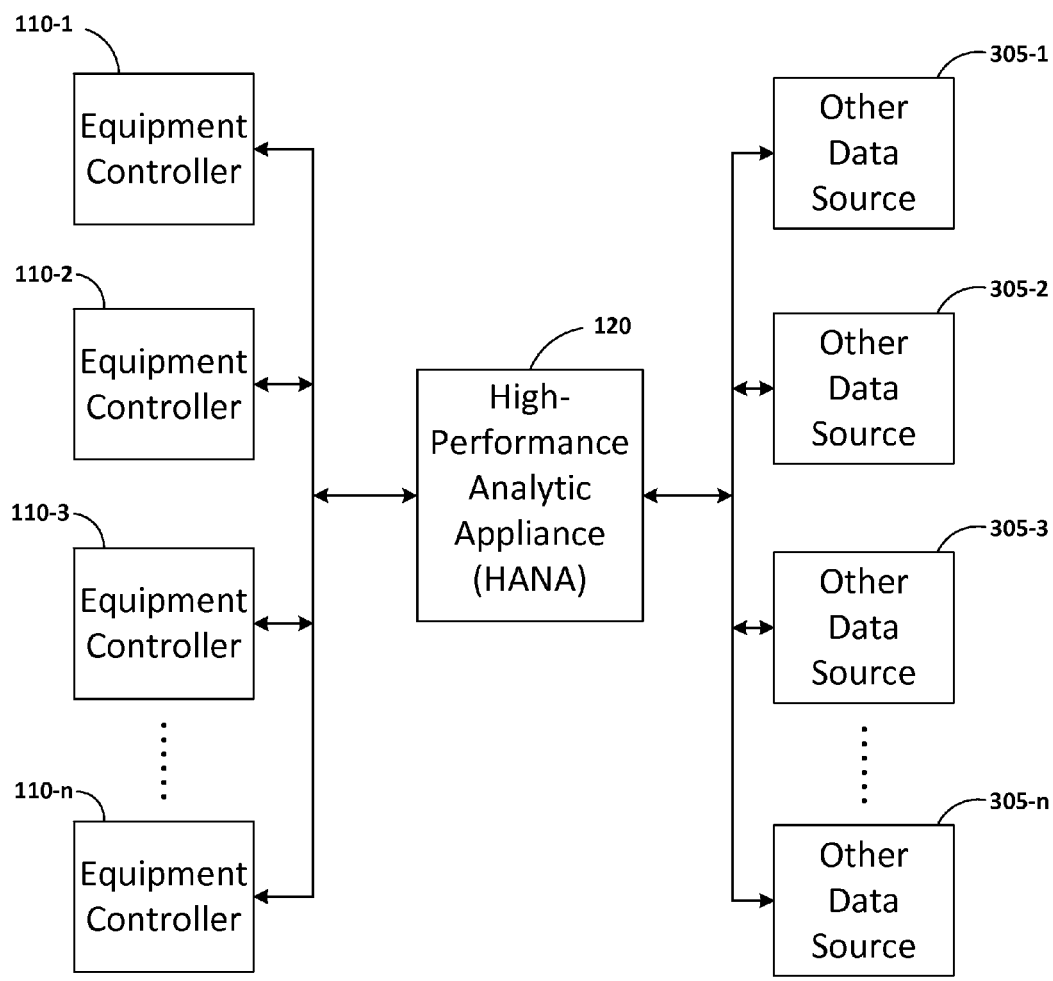
FIG. 3 illustrates a manufacturing system using the system of FIG. 1 according to an example embodiment.

FIG. 3 illustrates a manufacturing system using the system of FIG. 1 according to an example embodiment. As shown in FIG. 3, the system includes HANA 120, equipment controllers 110-1 to 110-n (described above with regard to equipment controller 110), and other data sources 305-1 to 305-n. The other data sources 305-1 to 305-n may include elements of a manufacturing system. For example, the other data sources 305-1 to 305-n may include inventory data sources (e.g., kanban bins and/or inventory information systems), quality control input systems (e.g., cameras and/or customer return data entry systems), operator information entry systems (e.g., data entry for failure codes) and/or the like. HANA 120, equipment controllers 110-1 to 110-n, and other data sources 305-1 to 305-n may be communicatively coupled via, for example, a local area network (LAN).

Figure 4:
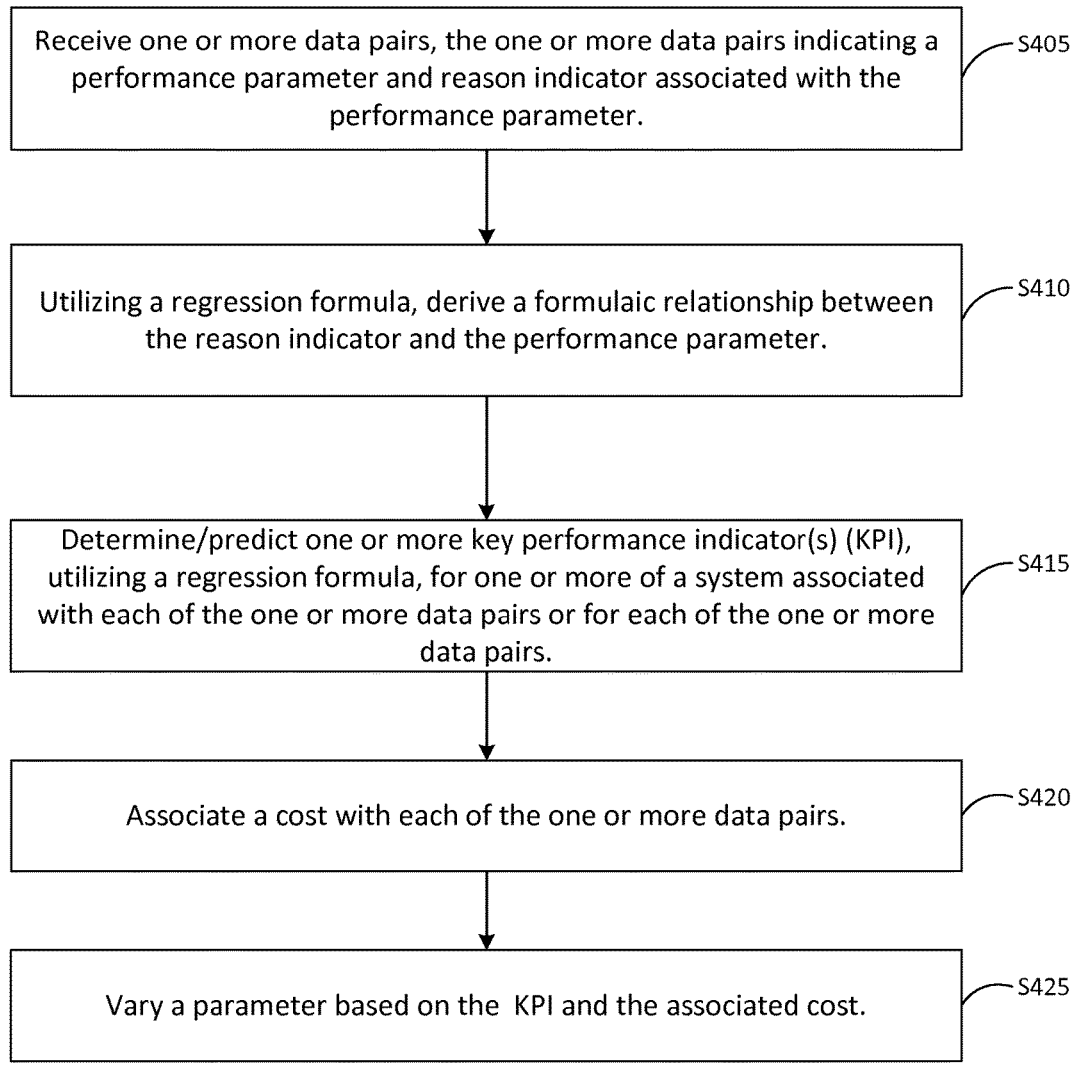
FIG. 4 illustrates a method according to at least one example embodiment.

FIG. 4 illustrates a method according to at least one example embodiment. The method steps described with regard to FIG. 4 may be executed as software code stored in a memory (e.g., at least one memory 210) associated with a HANA system (e.g., as shown in FIGS. 1 and 3) and executed by at least one processor (e.g., processor 205) associated with the HANA system. However, alternative embodiments are contemplated such as a HANA embodied as a special purpose processor.

For example, the method steps may be performed by an application-specific integrated circuit, or ASIC. For example, the ASIC may be configured as the HANA 120 and/or the in-memory computing module 125. Although the steps described below are described as being executed by a processor, the steps are not necessarily executed by a same processor. In other words, at least one processor may execute the steps described below with regard to FIG. 4.

As shown in FIG. 4, in step S405, a processor receives one or more data pairs. The one or more data pairs may be received from an in-memory computing module (e.g., in-memory computing module 125). The in-memory computing module may be a HANA (e.g., HANA 120). The one or more data pairs may indicate a performance parameter and a reason indicator associated with the performance parameter. For example, as discussed above the performance parameter may be associated with availability. Therefore, the performance parameter may include an indicator (e.g., up-time or down-time value) indicating overall availability. Further, as discussed above, availability may be further defined in terms of availability losses which may further be defined in terms of set-up (losses) and breakdown (losses). The performance parameter may be defined with respect to sub-terms. For example, the performance parameter may be availability losses, performance losses, quality losses and/or the like. For example, the performance parameter may be set-up (losses), breakdown (losses), minor stoppages, speed losses, start-up (quality) losses, in-process (quality) losses, and/or the like. Therefore, the performance parameter may be any variable or measurable (manufacturing) parameter that may have an associated reason for the variation.

The reason indicator may include a code associated with the performance parameter. For example, the reason indicator may include a code, for example a reason code, associated with breakdown, availability losses and/or availability. The associated reason code may be associated with a breakdown (availability loss and/or availability) reason (e.g., lack of maintenance, operator inattentiveness, poor design, poor training, material failures, and/or the like). For example, there may be a value range for reason codes (e.g., 0 to 10 or 0% to 100%) such that a first reason code value range (for breakdown, availability losses and/or availability) is associated with lack of maintenance and so forth for the remaining reason codes. The value range may indicate a severity associated with the reason code. Similarly, the reason indicator may be based on performance, quality, efficiency (or effectiveness) and the like based performance parameters.

In step S410, the processor utilizes a regression formula to derive a formulaic relationship between the reason indicator and the performance parameter. For example, utilizing equation 7 above, independent variables (e.g., x and $\beta$) may be expressed in terms of each other. For example, X (from equation 4) may be one or more reason indicators. For example, $x_1$ may be material failures associated with availability and $x_2$ may be kanban delay associated with quality. Each of $x_1$ and $x_2$ may range between 0% and 100%. For each of the combinations, a corresponding β (from equation 5) may be derived utilizing a first regression formula.

Deriving formulaic relationship between the reason indicator and the performance parameter may include selecting the regression formula from, for example, the HANA predictive algorithm library (PAL). The reason indicator and the performance parameter may be input as dependent variables in the selected regression formula. The formulaic relationship may be generated as linear dependencies between the reason indicator and the performance parameter. For example, HANA PAL may include a function that when called may return the formulaic relationship as, for example a data table. The HANA PAL function may include, as input, at least one table with input (e.g., historical, configuration, target, and/or the like) data.

In step S415, the processor utilizes a regression formula to determine and/or predict one or more key performance indicator(s) (KPI) for one or more of a system associated with each of the one or more data pairs or for each of the one or more data pairs. For example, equation 7 may be utilized as the regression formula. In the previous step, X from equation 4 and the corresponding β from equation 5 may be derived where X and β may be a formulaic relationship between the reason indicator and the performance parameter. Substituting X from equation 4 and the corresponding β from equation 5 into equation 7 and solving for the result y, where y is KPI, may be the determined and/or predicted one or more key performance indicator(s) (KPI).

In step S420, the processor associates a cost with each of the one or more data pairs. For example, cost for each reason code may be derived from an activity key associated with the reason code and/or data collection elements. This activity may be mapped such that cost per unit of the activity may be determined. For example, a per unit (e.g., each 1%) cost for each reason code may be stored in a database or XML file in the at least on memory 210. The at least one processor 205 may the query the database or XML file and associate the result with the one or more data pairs. The query result may be scaled by the value (e.g., 0 to 10 or 0% to 100%) associated with the reason code. The cost for a plurality of data pairs for an associated plurality of reason indicators may be determined where parameters for a plurality of elements (e.g., as shown in FIG. 3) are affected.

In step S425, the processor varies a parameter based on the KPI and the associated cost. For example, varying the parameter may affect one or more of the performance parameters. As described above, HANA 120 may be configured to store information. The information may include data associated with a machine (e.g., machine 105), non-machine systems (e.g., inventory) and/or multi-element systems. For example, the information may include data associated with availability, data associated with quality, data associated with efficiency or effectiveness and/or the like.

As discussed above, availability, quality, efficiency or effectiveness and/or the like may be KPI. Therefore, the processor may vary a parameter that the aforementioned data is dependent on. For example, performance may be dependent on speed. Therefore, the processor may vary a parameter that affects speed. For example, quality may be dependent on kanban delay. Therefore, the processor may vary a parameter that affects kanban delay. According to example embodiments, the processor may vary the parameter in a simulated environment in order to develop a best practices configuration for a system that the simulated environment is based on.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method, comprising:
   in a data warehouse appliance including a data structure stored in random access memory (RAM), the data warehouse appliance being configured to synchronize data between the data structure and a data warehouse, the data warehouse appliance being configured to query data stored in the data structure, and the data warehouse appliance being communicatively coupled to at least one controllable manufacturing element:
   receiving data pairs at the data warehouse appliance and from the at least one controllable manufacturing element, the data pairs indicating p number of values of a performance parameter and n×p total number of reason indicator values, comprising n number of reason indicator values associated with each of the p values of the performance parameter;
   storing the received data pairs in the RAM;
   deriving, by the data warehouse appliance, using the data pairs stored in the RAM, a formulaic relationship, utilizing a regression formula, between the reason indicator values and the performance parameter, including defining a vector variable for the p values of the performance parameter, and defining a matrix variable for the n×p total reason indicator values;
   predicting at least one key performance indicator (KPI), utilizing the derived formulaic relationship, for the data pairs;
   associating a cost with each of the data pairs;
   varying a parameter of the at least one controllable manufacturing element based on the KPI and the associated cost; and
   communicating the varied parameter to the at least one controllable manufacturing element.

2. The method of claim 1, wherein
   the performance parameter includes data associated with performance of the at least one controllable manufacturing element, and
   the at least one controllable manufacturing element includes at least one of a manufacturing machine, an element of a manufacturing system and a manufacturing system.

3. The method of claim 2, wherein the element of a manufacturing system includes at least one of inventory data sources, quality control systems, and operator information entry systems.

4. The method of claim 1, wherein the reason indicator is a code associated with the performance parameter.

5. The method of claim 1, wherein the reason indicator includes value range indicating a severity associated with the reason code.

6. The method of claim 1, wherein deriving a formulaic relationship, utilizing a regression formula, between the reason indicator and the performance parameter includes,
   selecting the regression formula,
   inputting the reason indicator and the performance parameter as independent variables in the regression formula, and
   generating the formulaic relationship as linear dependencies.

7. The method of claim 1, wherein predicting at least one key performance indicator (KPI), utilizing a regression formula includes,
   selecting a first regression formula,
   inputting the reason indicator and the performance parameter as independent variables in the first regression formula, generating linear dependencies between the reason indicator and the performance parameter, selecting a second regression formula, inputting the linear dependent reason indicator and performance parameter as independent variables in the second regression formula, and generating the at least one KPI as linear dependent variables of the second regression formula.

8. The method of claim 1, wherein the cost associated with each of the one or more data pairs is determined based on a cost per unit of an activity associated with the reason indicator.

9. A data warehouse appliance, comprising:

at least one processor, and a random access memory (RAM) including a data structure, wherein the data warehouse appliance is configured to synchronize data between the data structure and a data warehouse communicatively coupled to the data warehouse, the data warehouse appliance is configured to query data stored in the data structure, the data warehouse appliance is communicatively coupled to at least one controllable manufacturing element, and the RAM including at least one memory portion storing code segments that when executed by the processor cause the processor to, receive data pairs at the data warehouse appliance and from the at least one controllable manufacturing element, the data pairs indicating p number of values of a performance parameter and n×p total number of reason indicator values, comprising n number of reason indicator values associated with each of the p values of the performance parameter;

store the received data pairs in the data structure;

derive, by the data warehouse appliance, using the data pairs stored in the data structure, a formulaic relationship, utilizing a regression formula, between the reason indicator values and the performance parameter, including defining a vector variable for the p values of the performance parameter, and defining a matrix variable for the n×p total reason indicator values;

predict at least one key performance indicator (KPI), utilizing the derived formulaic relationship, for the data pairs;

associate a cost with each of the data pairs; and vary a parameter of the at least one controllable manufacturing element based on the KPI and the associated cost; and communicate the varied parameter to the at least one controllable manufacturing element.

10. The data warehouse appliance of claim 9, wherein the performance parameter includes data associated with performance the at least one controllable manufacturing element, and the at least one controllable manufacturing element includes at least one of a manufacturing machine, an element of a manufacturing system and a manufacturing system.

11. The data warehouse appliance of claim 10, wherein the element of a manufacturing system includes at least one of inventory data sources, quality control systems, and operator information entry systems.

12. The data warehouse appliance of claim 9, wherein the reason indicator is a code associated with the performance parameter.

13. The data warehouse appliance of claim 9, wherein the reason indicator includes value range indicating a severity associated with the reason code.

14. The data warehouse appliance of claim 9, wherein deriving a formulaic relationship, utilizing a regression formula, between the reason indicator and the performance parameter further cause the processor to, select the regression formula, input the reason indicator and the performance parameter as independent variables in the regression formula, and generate the formulaic relationship as linear dependencies.

15. The data warehouse appliance of claim 9, wherein predicting at least one key performance indicator (KPI), utilizing a regression formula further causes the processor to, select a first regression formula, input the reason indicator and the performance parameter as independent variables in the first regression formula, generate linear dependencies between the reason indicator and the performance parameter, select a second regression formula, input the linear dependent reason indicator and performance parameter as independent variables in the second regression formula, and generate the at least one KPI as linear dependent variables of the second regression formula.

16. The data warehouse appliance of claim 9, wherein the cost associated with each of the one or more data pairs is determined based on a cost per unit of an activity associated with the reason indicator.

* * * * *